(12) United States Patent
Ferreira da Silva Pereira

(10) Patent No.: US 12,326,551 B2
(45) Date of Patent: Jun. 10, 2025

(54) CRAYFORD FOCUSER FOR ASTRONOMICAL TELESCOPES

(71) Applicant: Nimax GmbH, Bavaria (DE)

(72) Inventor: Pedro Manuel Ferreira da Silva Pereira, Palhaca (PT)

(73) Assignee: Nimax GmbH, Bavaria (DE)

( * ) Notice: Subject to any disclaimer, the term of this patent is extended or adjusted under 35 U.S.C. 154(b) by 699 days.

(21) Appl. No.: 17/698,015

(22) Filed: Mar. 18, 2022

(65) Prior Publication Data
US 2022/0299747 A1 Sep. 22, 2022

Related U.S. Application Data

(60) Provisional application No. 63/163,120, filed on Mar. 19, 2021.

(51) Int. Cl.
G02B 23/16 (2006.01)
G02B 7/04 (2021.01)

(52) U.S. Cl.
CPC .............. *G02B 23/16* (2013.01); *G02B 7/04* (2013.01)

(58) Field of Classification Search
None
See application file for complete search history.

(56) References Cited

U.S. PATENT DOCUMENTS

| | | | |
|---|---|---|---|
| 5,303,090 A | 4/1994 | Burr | |
| 6,069,754 A * | 5/2000 | Schmidt | G02B 7/08 |
| | | | 359/825 |
| 6,297,917 B1 * | 10/2001 | Burr | G02B 7/04 |
| | | | 359/825 |
| 6,327,081 B1 * | 12/2001 | Persha | G02B 23/16 |
| | | | 359/425 |

* cited by examiner

*Primary Examiner* — Derek S. Chapel
(74) *Attorney, Agent, or Firm* — DP IP GROUP; Franco S. De Liguori

(57) ABSTRACT

A Crayford focuser includes a body member having an inner wall defining a central channel. A first bearing holding structure extends outward from the inner wall and is open to the central channel at one end. A second bearing holding structure extends outward from the inner wall and is open to the central channel at one end. First and second bearing rails are removably held by the first bearing holding structure and the second bearing holding structure, respectively.

25 Claims, 7 Drawing Sheets

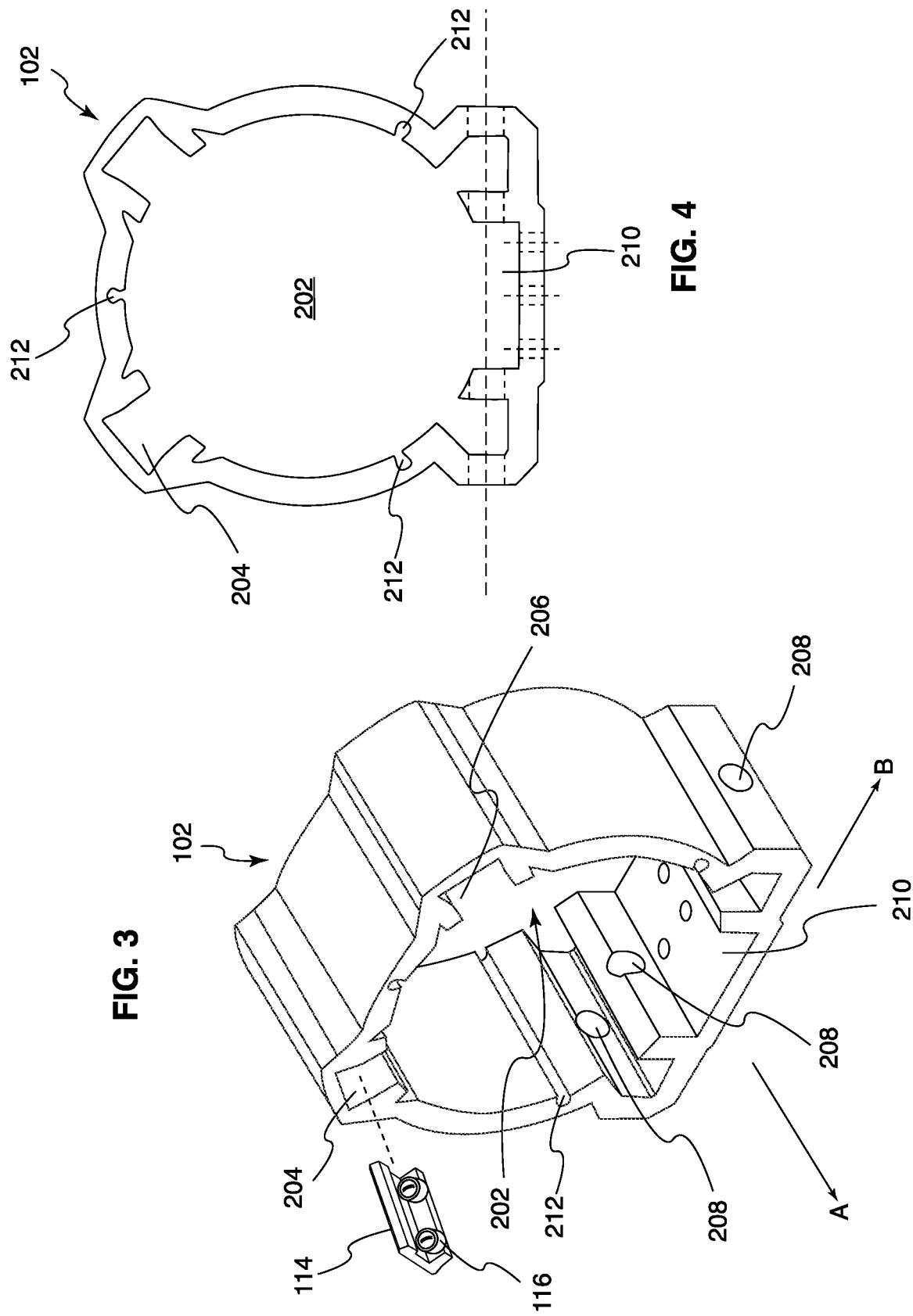

CRAYFORD FOCUSER FOR ASTRONOMICAL TELESCOPES

RELATED APPLICATION

This application claims the benefit of U.S. Provisional Patent Application No. 63/163,120, filed on Mar. 19, 2021.

BACKGROUND

Field

The present invention relates to optical focusers for astronomical telescopes, and more particularly to Crayford focusers.

Background Information

An optical telescope, it will be appreciated, is a combination of two optical systems, such systems cooperating to bring a distant object into view. The systems, namely an eyepiece and an objective, are relatively positionally adjustable via an optical focuser. Optical telescopes use focusers to adjust the position of an eyepiece or imaging sensor to achieve a fine focus of astronomical objects. Several types of focusers are commonly used for astronomy: rack-and-pinion, helical, and Crayford. Most commonly, the focuser is mounted to the telescope objective and the eyepiece, or imaging sensor, is carried by the focuser and moved relative to the objective to effect telescope focus. Focus is achieved when the primary principle focal point of the eyepiece, or imaging sensor, is brought into coincidence with the secondary principle focal point of the objective.

SUMMARY

According to an aspect of the present invention, a Crayford focuser is provided. In one embodiment, a Crayford focuser includes a body member having an inner wall defining a central channel, a first bearing holding structure extending outward from the inner wall and being open to the central channel at one end, a second bearing holding structure extending outward from the inner wall and being open to the central channel at one end, and first and second bearing rails removably held by the first bearing holding structure and the second bearing holding structure, respectively.

In another embodiment, a Crayford focuser includes a body member having an inner wall defining a central channel, a first bearing holding structure extending outward from the inner wall and being open to the central channel at one end, a second bearing holding structure extending outward from the inner wall and being open to the central channel at one end, first and second bearing rails removably held by the first bearing holding structure and the second bearing holding structure respectively, a bottom cover having a central opening aligning with the central channel, and a top cover having a central opening aligning with the central channel, the top cover and bottom cover configured to sandwich the body member therebetween and hold the first and second bearing rails within the first bear holding structure and the second bearing holding structure respectively. In an exemplary embodiment, a drawtube is dimensioned to slide within the central channel of the body member.

In another aspect, a body member of a Crayford focuser is provided. The body member of the Crayford focuser includes an inner wall defining a central channel, a first bearing holding structure extending outward from the inner wall and being open to the central channel, and a second bearing holding structure extending outward from the inner wall and being open to the central channel.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is an isometric view of a body member of the Crayford focuser shown in FIG. 2, in accordance with an embodiment of the present invention;

FIG. 4 is a cross-sectional view of the body member of the Crayford focuser shown in FIG. 2, in accordance with an embodiment of the present invention.

DETAILED DESCRIPTION OF PREFERRED EMBODIMENTS

Figure 1A:
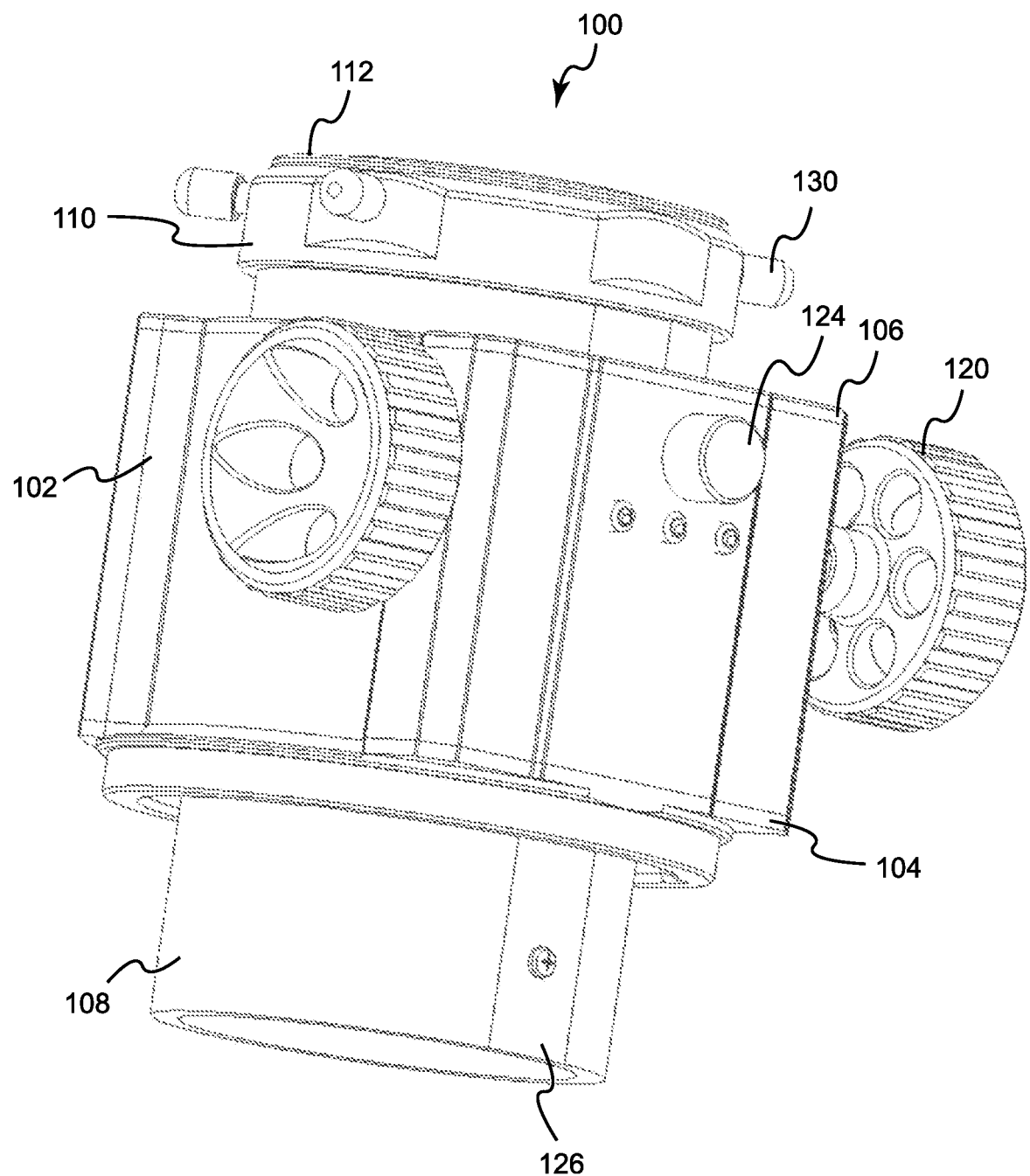
FIG. 1A is a first perspective view of an assembled Crayford focuser, in accordance with an embodiment of the present invention.
Figure 1B:
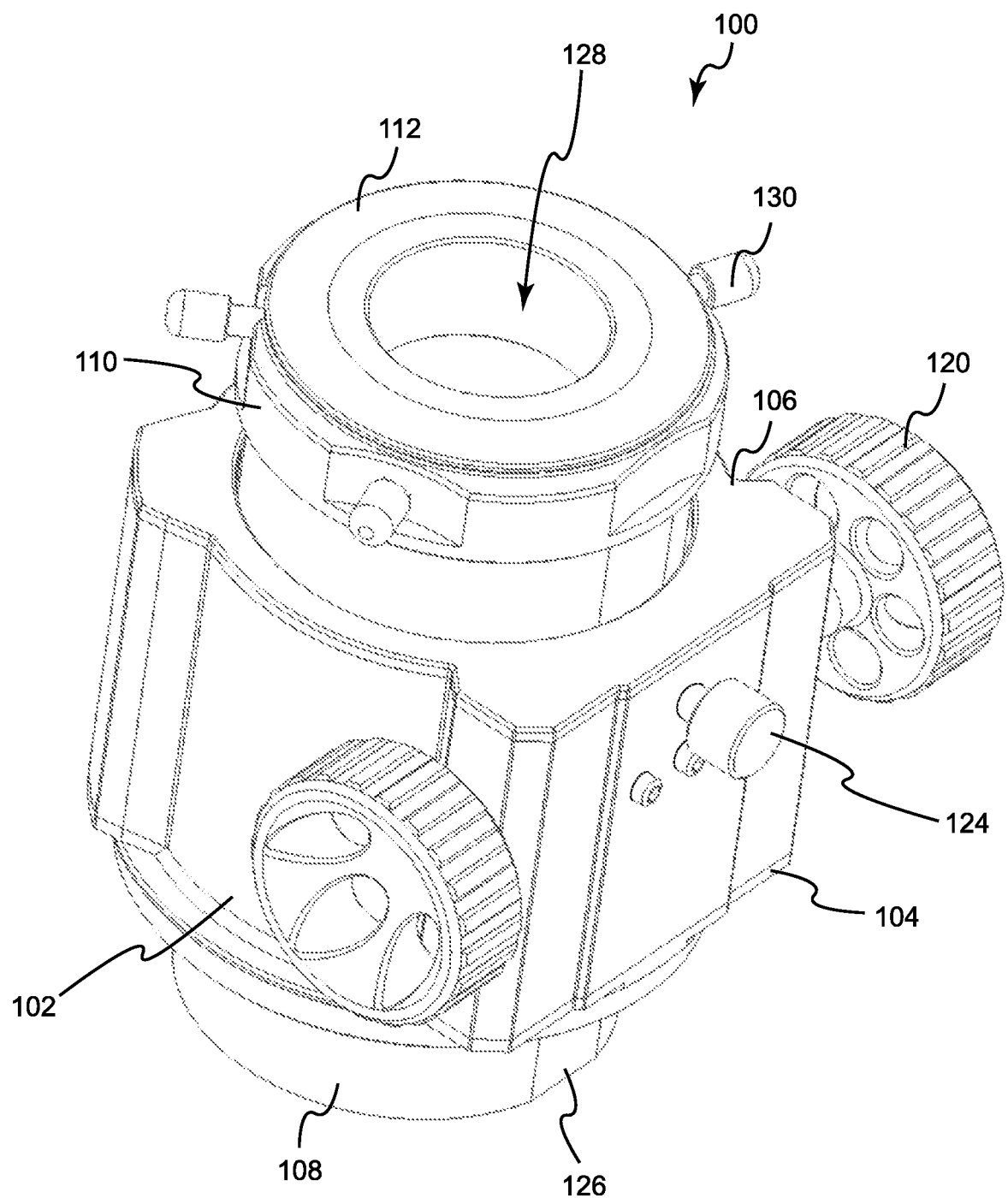
FIG. 1B is a second perspective view of an assembled Crayford focuser, in accordance with an embodiment of the present invention.
Figure 1C:
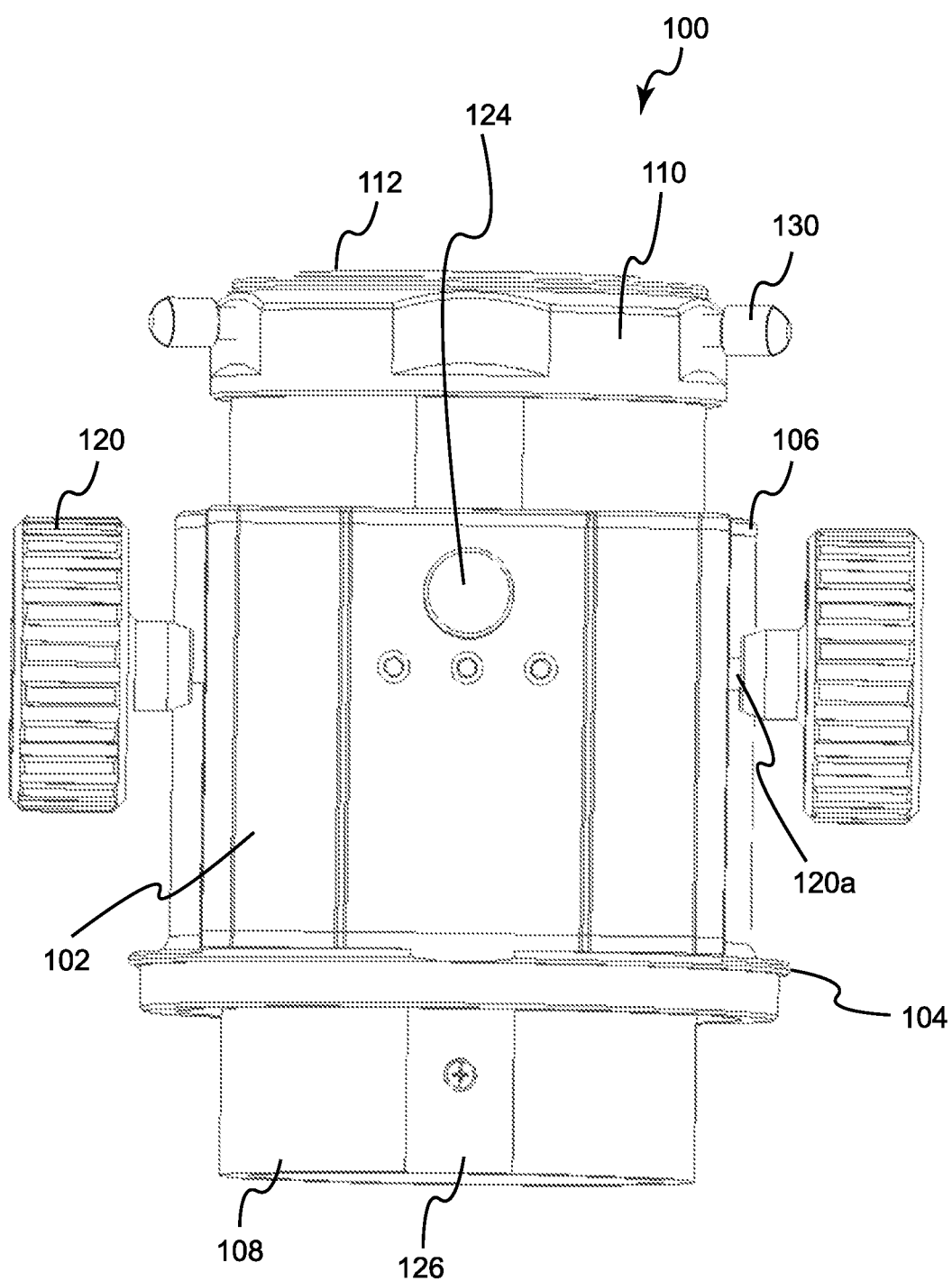
FIG. 1C is a third perspective view of an assembled Crayford focuser, in accordance with an embodiment of the present invention.

Prior art Crayford focusers can be complex and costly to fabricate. Some embodiments of the present invention provide a novel Crayford focuser having unique structures that facilitate construction of the Crayford focuser, thereby reducing manufacturing costs.

A Crayford focuser 100, according to an embodiment of the present invention, is shown in FIG. 1A through FIG. 1D. The Crayford focuser 100 includes a body member 102 having a bottom cover 104 and a top cover 106. An aperture extends through the top cover 106, the body member 102 and the bottom cover 104. The aperture is dimensioned to receive a drawtube 108 that is configured to slide along a longitudinal direction within the aperture. The longitudinal movement of the drawtube 108 is accomplished by rotation of a focusing knob 120 that causes rotation of a focus adjustment shaft 120a extending laterally through the body member 102. The focus adjustment shaft 120a is held in direct contact with a flat region 126 of the drawtube 108. By way of a frictional force between the focus adjustment shaft and the flat region 126, the drawtube 108 can be extended from or retracted into the body member 102 based on the rotational direction of the focusing knob 120.

An end of the drawtube 108 extending outward from the top cover 106 is capped by a top ring 110. The top ring 110 includes one or more thumb screw 130 configured to extend radially inward and impinge on an optical element, e.g., eyepiece, imaging device or optical adapter 112, for example, thus holding the optical element securely within an eyepiece aperture 128 of the top ring 110. In some embodiments, the thumb screw 130 contacts a compression ring that deforms when the thumb screw 130 is screwed into the top ring 110. The compression ring, so deformed, clamps onto the optical element and secures the optical element within the eyepiece aperture 128.

In some embodiments, the Crayford focuser 100 also includes a brake bolt 124 that can be extended or retracted into the body member 102 by way of appropriate rotation of the brake bolt 124. By extending the brake bolt 124 into the body member 102, an end of the brake bolt 124 applies a normal force onto the flat region 126 of the drawtube 108. In an embodiment, the brake bolt 124 pushes the drawtube 108 away from focus adjustment shaft 120a eliminating any existing friction therebetween. Thus, the shaft is either engaged (generating friction) or loose. Alternatively, the brake bolt 124 applies a normal force to the flat region 126 sufficient to prevent movement of the drawtube 108 either by rotation focusing knob 120 and/or by the weight of one or more optical elements (e.g., eyepiece, digital imaging device, filter carousel, etc.) mounted to the drawtube 108. The brake bolt 124 can be loosened to allow easy focus adjustment and tightened to prevent unwanted movement of the drawtube 108 that can cause a loss of focus when a heavy optical element is mounted to the drawtube 108, for example.

Figure 1D:
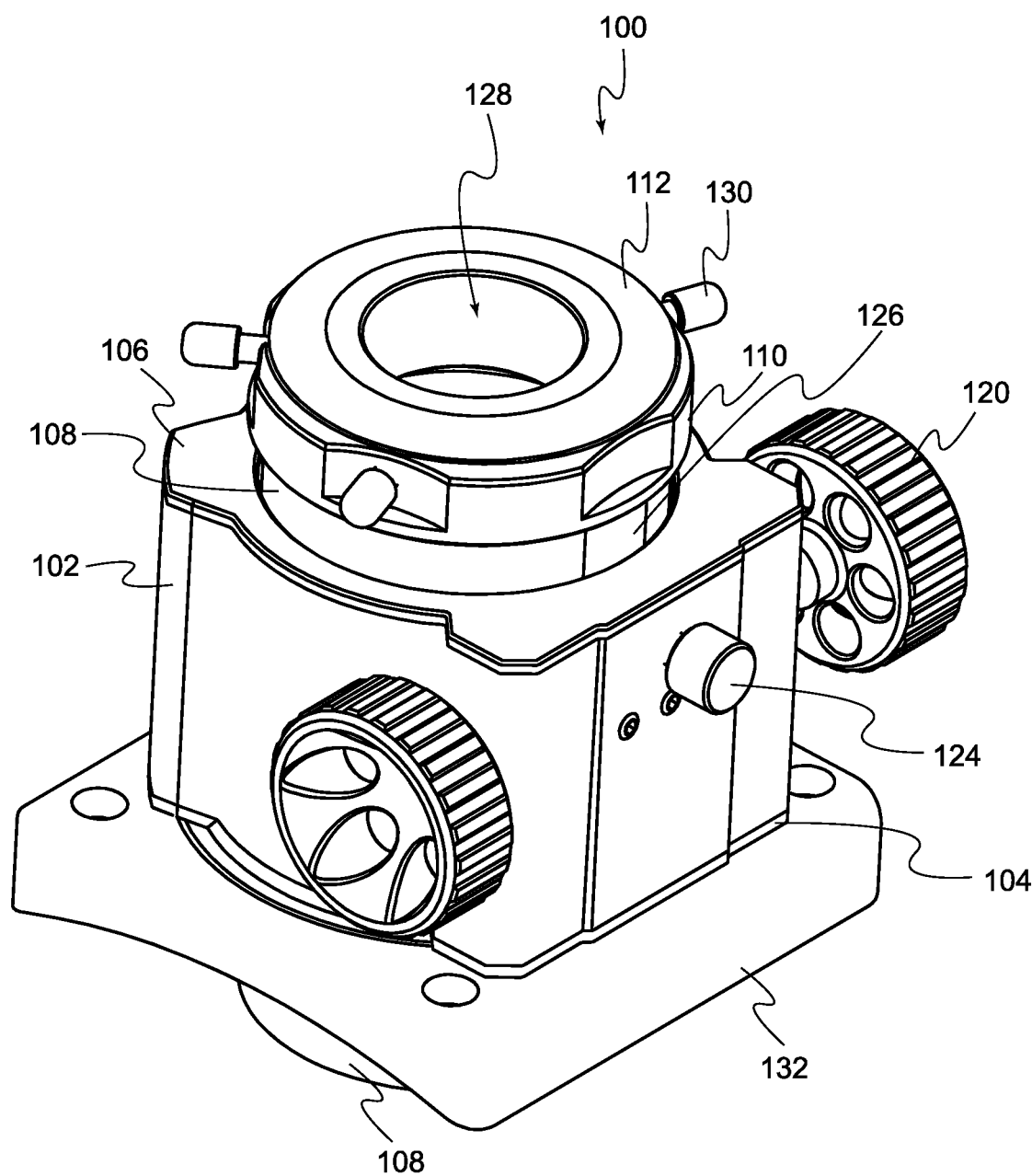
FIG. 1D is a fourth perspective view of an assembled Crayford focuser, in accordance with an embodiment of the present invention.

In FIG. 1D, the Crayford focuser 100 includes a mounting adapter 132. The mounting adapter 132 shown in FIG. 1D is dimensioned to join the Crayford focuser 100 to a curved surface of a Newtonian optical tube assembly (not shown). Other mounting adapters 132 can be coupled to the bottom cover 104 configured to join the Crayford focuser 100 to other types of telescopes. For example, a mounting adapter 132 forming a threaded female end can be attached to the bottom cover 104 to join the Crayford focuser 100 to a threaded rear cell of a Schmidt-Cassegrain (SCT) optical tube assembly (not shown). In yet another embodiment, the mounting adapter 132 can be formed as an extended tube configured for insertion into a visual back found on some SCT optical tube assemblies.

Figure 2:
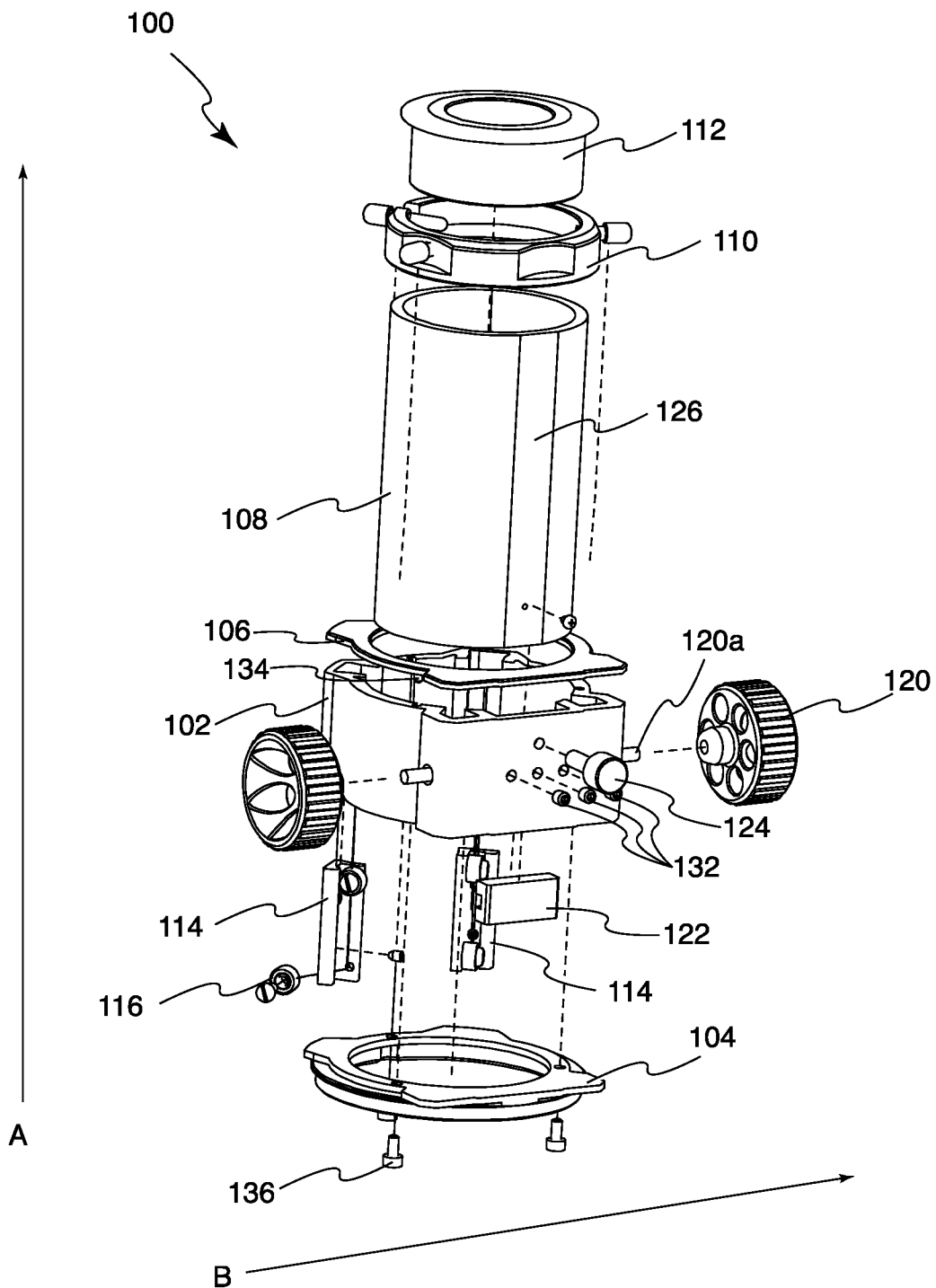
FIG. 2 is an exploded view of a Crayford focuser, in accordance with an embodiment of the present invention.

Turning to FIG. 2, an exploded view of a Crayford focuser 100, in accordance with an embodiment of the present invention, is shown. The body member 102 includes a pair of bearing rails 114. Each bearing rail 114 holds one or more bearings 116, such as roller bearings, for example. The bearings 116 are oriented to exert a normal force on a surface of the drawtube 108 and to allow motion in a longitudinal direction (indicated by line A) of the drawtube 108 through the body member 102. The bearing 116 can be roller bearings, for example. In other embodiments, the bearing 116 can be linear bearings. The bearing rails 114 are held in place by rail holding structures 204 (shown in FIG. 3) formed on an interior of the body member 102, the bottom cover 104 secured to a bottom surface of the body member 102, and the top cover 106 secured to a top surface of the body member 102. The bottom cover 104 and the top cover 106 can be secured to the body member 102 by way of bolts, welds, industrial adhesives, or other appropriate securing means.

The bottom surface of the body member 102 herein is the side of the body member 102 that is to attach to a telescope optical tube assembly (not shown). The top surface of the body member 102 is the side of the body member 102 opposite the telescope optical tube assembly.

As shown in FIG. 2, a through hole extends through a central opening of the bottom cover 104, a central channel 202 (shown in FIG. 3) of the body member 102 and a central opening of the top cover 106. The top cover 106 and the bottom cover 104 can be joined to the body member 102 using interference fittings, also known as press or friction fittings. For example, pegs 134 can be formed on a surface of the top cover 106 facing the body member 102. Each peg 134 corresponds to channels 212 (shown in FIG. 2). Each peg 134 is aligned and pressed into the corresponding channel 212. Because the peg 134 has a slightly larger diameter than the channel 212, pressing the peg 134 into the corresponding channel 212 can create a secure interference fitting therebetween. The bottom cover 104 can be similarly joined to the body member 102. However, once so joined the top cover 106 and the bottom cover 104 cannot be easily removed without damage. Thus, in some embodiments the bottom cover 104 can be secured using bolts 136, for example, configured to removably screw into the corresponding channels 212.

In other embodiments, industrial adhesives or epoxy can be used to bond the top cover 106 and/or bottom cover 104 to the body member 102. In other embodiments, the top cover 106 and/or bottom cover 104 can be secured to the body member 102 by way of one or more screws or bolts.

The drawtube 108 is inserted into the through hole, such that the outside surface of the drawtube 108 is in contact with the bearings 116. Additionally, a PTFE (polytetrafluoroethylene) block 122, is positioned between the inside wall of the body member 102 and a focus adjustment shaft 118 that is inserted through a bore hole extending laterally (in the direction indicated by line B) through the body member 102. The PTFE block 122 can be adjusted to push the focus adjustment shaft 118 against a flat region 126 of the drawtube 108.

The adjustment of the PTFE block 122 can be accomplished by operation of one or more adjustment bolts 132. Increasing contact pressure between the focus adjustment shaft 118 and the flat region 126 of the drawtube 108 can facilitate movement of the drawtube 108 when a heavy optical element, such as a digital imaging sensor, for example, is mounted thereon by increasing friction at a point of contact of the focus adjustment shaft 118 and the flat region 126. A focus knobs 120 can be mated to an end of the focus adjustment shaft 118 to allow manual focus adjustment. In other embodiments, an electric motor (not shown), e.g., stepper motor or servo motor, for example, can be coupled to the focus adjustment shaft 118 in place of, or in addition to, the focus knob 120. In some embodiments, the PTFE block 122 can be replaced with another low friction material.

The drawtube 108 can be capped with a top ring 110 configured to hold an eyepiece, imaging sensor or eyepiece adapter 112 to the drawtube 108. The top ring can include one or more thumb screws for securely holding an eyepiece, or other optical device to the drawtube 108. The top ring 110 can be joined to the drawtube 110 using interference fittings, also known as press or friction fitting. In other embodiments, industrial adhesives or epoxy can be used to bond the top ring 110 to the drawtube 108. In other embodiments, the top ring 110 is secured to the drawtube 108 by way of one or more screws or bolts. In still other embodiments, the top ring 110 can be secured to the drawtube 108 using matching threads formed on respective surfaces of the drawtube 108 and the top ring 110.

Turning to FIG. 3, an isometric view of the body member 102 shows internal structures thereof. The unique structures shown in FIG. 3 facilitates construction of the Crayford focuser 100 and can reduce the time and cost for manufacturing Crayford focusers in accordance with the present invention. As shown, the body member 102 has a central channel 202 extending through the body member 102 in a direction corresponding with line A. The perimeter of the central channel 202 defining an inner wall of the body member 102. A first bearing holding structure 204 extends outward from the inner wall, and a second bearing holding structure 206 extends outward from the inner wall. The first bearing holding structure 204 and the second bearing holding structure 206 are open to the central channel 202 such that bay-like regions are formed. The first bearing holding structure 204 and the second bearing holding structure 206, in some embodiments, are positioned at a predefined separation along the perimeter of the central channel 202. In embodiments, the separation between first bearing holding structure 204 and the second bearing holding structure 206 form an angle between 90° and 100°.

The first bearing holding structure 204 and the second bearing holding structure 206 each have a generally inverted trapezoidal cross-sectional, as can be seen in FIG. 4. The shortest side of the trapezoidal cross-section is open to the central channel 202. Each bearing rail 114 slides into the trapezoidal cross-section of the respective first bearing holding structure 204 and second bearing holding structure 206. In other embodiments, first bearing holding structure 204 and the second bearing holding structure 206 can have cross-sectional shape other than trapezoidal.

Embodiments of the present invention, using the bearing holding structures 204, 206 described herein can eliminate the need for screws to hold the bearing rails 114 in place, instead relying on interference fits. The top cover 106 and the bottom cover 104 (shown in FIG. 2), once attached to the body member 102, trap the bearing rails 114 within their respective bearing holding structure 204, 206. Additionally, industrial grade adhesives can be used to further secure the bearing rails 114 in the bearing holding structures 204, 206. In some embodiments, set or grub screws can be present to adjust a tilt of the bearing rails 114, either from inside or outside.

A through-bore 208 extends laterally (in the direction of line B) through a portion of the body member 102 opposite the first bearing holding structure 204 and the second bearing holding structure 206. A focus adjustment shaft, 118 is inserted into the through bore 208 as shown in FIG. 2 and capped with focus knobs 120. Additionally, a lower recess 210 is present below the through-bore 208 and configured to receive the PTFE block 122 as shown in FIG. 2. FIG. 4 shows the body member 102 of FIG. 3 viewed head on along the direction of line A.

By fabricating a die having the cross-sectional profile of the base member 102 shown in FIG. 4, the base member 102 can be produced using an extrusion process. The base member 102 can be constructed from, for example, aluminum, brass, or steel. Other materials, such as metals and plastics, can be used as appropriate.

Alternatively, cast aluminum can be used to fabricate the body member 102. However, casting can be significantly more expensive since the cast tooling cost can exceed, by multiples of four to five, the cost of aluminum profile tooling. A 50-foot-long aluminum profile can be cut to the require size by a metal bandsaw. Any necessary holes can then be added to the cut piece. Once the necessary holes are added the body member 102 is ready for final assembly. The application of interference fits, in the form of the bearing holding structures 204 and 206, configured to hold the bearing rails 114 in place can provide another advantage, as the interference fits allows the bearing rails 114 to be sandwiched between the top cover 106 and the bottom cover 104. This allows the bearing rails 114 to be fixed without the need for another set of fixing screws. Thus, embodiments of the present invention can decrease manufacturing costs of a Crayford focuser 100 by an estimate of 20%. Also, the drawtube 108 presses against the bearing 116 and the focus adjustment shaft 118 adding more stability to the system, which relieves any pressure from the rails from moving from the existing position. Tooling costs can also be reduced, thus allowing for the tooling costs to be amortized faster than by traditional cast processes.

Figure 5:
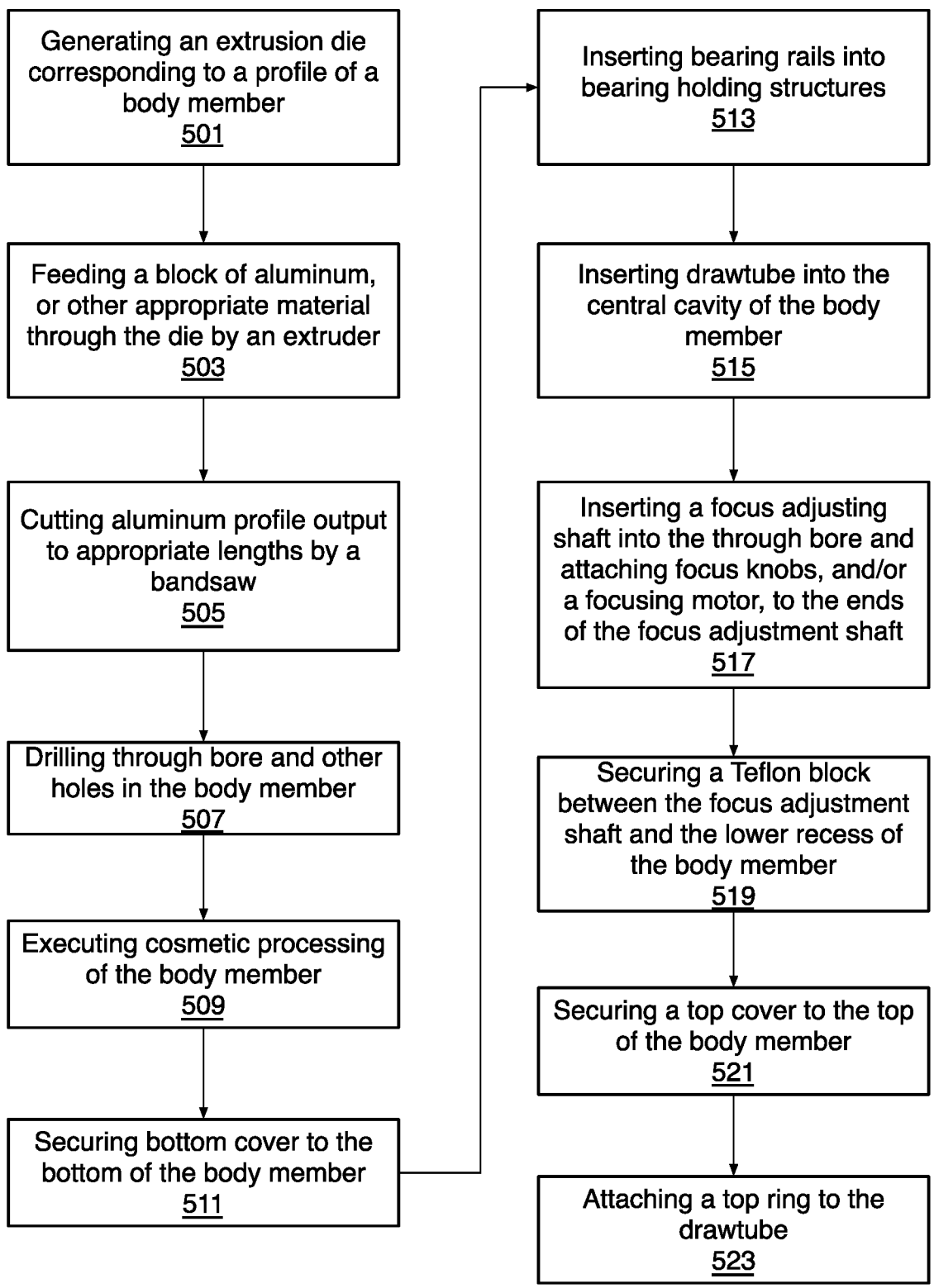
FIG. 5 is a flow diagram illustrating a process for fabricating a Crayford focuser, in accordance with an embodiment of the present invention.

Turning to FIG. 5, a fabrication process for an embodiment of a Crayford focuser 100 in accordance with the present invention will now be described with reference to FIG. 2-4. Initially, the process begins, at block 501, by generating an extrusion die corresponding to a profile of a body member 102, as shown, for example, in FIG. 4. It should be noted that the profile die need only be manufactured once, as the die can be used for multiple extrusion runs. With the extrusion die generated, a block of aluminum, or other appropriate material, can be fed through the die by an extruder at block 503. The aluminum profile output can be cut at block 505, to appropriate lengths by a bandsaw, for example. A through bore 208 (shown in FIG. 2) can be drilled out, block 507, using a drill press, for example. Additional bolt holes can also be drilled out as needed at block 507. Once all holes are drilled out, cosmetic processes can be performed at block 509, such as anodizing, painting, or polishing the body member 102, for example.

The body member 102 is ready for final assembly. Thus, a bottom cover 104 can be secured to the bottom of the body member 102 at block 511 using bolts, industrial adhesive, epoxy, welds, or a combination thereof. The bearing railings 114 can be inserted, at block 513, into the respective bearing holding structures 204, 206. At block 515, a drawtube 108 is inserted into the central cavity 202 of the body member 102. A focus adjustment shaft 118 can inserted into the through bore 208 and focus knobs 120, and/or a focusing motor, can be attached to the ends of the focus adjustment shaft 118 at block 517. A PTFE block 122 is secured to the body member 102 between the focus adjustment shaft 118 and the lower recess 210, at block 519. With the PTFE block 122 secured in the body member 102, a top cover 106 can be secured to the top of the body member 102, at block 521, using bolts, industrial adhesive, epoxy, welds, or a combination thereof. A top ring 110 is attached, at block 523, to the drawtube 108 using bolts, industrial adhesive, epoxy, matching threads on the top ring 110 and drawtube 108, or a combination thereof.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A body member of a Crayford focuser, comprising:
an inner wall defining a central channel;
a first bearing holding structure extending outward from the inner wall and being open to the central channel, the first bearing holding structure being configured to holdingly accept a first bearing rail;
a second bearing holding structure extending outward from the inner wall and being open to the central channel, the second bearing holding structure being configured to holdingly accept a second bearing rail; and
a top cover having a central opening aligned with the central channel.

2. The body member of the Crayford focuser as in claim 1, further comprising a bottom cover having a central opening aligned with the central channel.

3. The body member of the Crayford focuser as in claim 2, wherein the top cover and the bottom cover are configured to sandwich the body member therebetween and hold the first bearing rail and second bearing rail within the first bearing holding structure and the second bearing holding structure, respectively.

4. The body member of the Crayford focuser as in claim 3, wherein the bottom cover includes an optical tube assembly (OTA) adapter configured to join the body member to an OTA.

5. The body member of the Crayford focuser as in claim 4, wherein the OTA adapter is configured to join the body member to a curved side surface of an OTA.

6. The body member of the Crayford focuser as in claim 4, wherein the OTA adapter is configured to join the body member to a threaded rear cell of an OTA.

7. The body member of the Crayford focuser as in claim 3, wherein at least one of the bottom cover and the top cover is secured to the body member by one or more bolts.

8. A Crayford focuser having the body member of claim 3, a first bearing rail received by the first bearing holding structure of the body member, and a second bearing rail received by the second holding structure of the body member.

9. The body member of the Crayford focuser as in claim 1, wherein the central channel is configured to receive a drawtube.

10. The body member of the Crayford focuser as in claim 1, further comprising an adhesive securely holding the first bearing rail and the second bearing rail within the first bearing holding structure and the second bearing holding structure, respectively.

11. A Crayford focuser, comprising:
a drawtube;
a body member having an inner wall defining a central channel within which the drawtube is configured to slide, the body member comprising:
a first bearing holding structure extending outward from the inner wall and having a channel that opens into the central channel;
a first bearing rail configured to be removably mounted within the channel of the first bearing holding structure, the first bearing rail having a bearing for contacting the drawtube when the drawtube slides within the central channel;
a second bearing holding structure extending outward from the inner wall and having a channel that opens into the central channel;
a second bearing rail configured to be removably mounted within the channel of the second bearing holding structure, the second bearing rail having a bearing for contacting the drawtube when the drawtube slides within the central channel; and
wherein the first and second bearing rails extend in a longitudinal direction parallel to a longitudinal axis of the central channel of the body member.

12. The Crayford focuser as in claim 11, wherein the bearing of each of the first and second bearing rails is oriented to contact the drawtube to facilitate siding movement of the drawtube in a direction parallel to the longitudinal axis of the central channel of the body member.

13. The Crayford focuser as in claim 11, wherein: the channel of the first bearing holding structure is configured to slidingly receive the first bearing rail; and the channel of the second bearing holding structure is configured to slidingly receive the second bearing rail.

14. The Crayford focuser of claim 13, wherein each of the first and second bearing rails has a roller bearing oriented to contact and facilitate movement of the drawtube along a longitudinal axis of the central channel.

15. The Crayford focuser as in claim 11, further comprising:
a bottom cover having a central opening aligning with the central channel; and
a top cover having a central opening aligning with the central channel, the top cover and bottom cover being configured to sandwich the body member therebetween and hold the first and second bearing rails within the first bear holding structure and the second bearing holding structure, respectively.

16. The Crayford focuser as in claim 15, wherein the bottom cover includes an optical tube assembly (OTA) adapter configured to join the body member to an OTA.

17. The Crayford focuser as in claim 16, wherein the OTA adapter is configured to join the body member to a curved side surface of an OTA.

18. The Crayford focuser as in claim 16, wherein the OTA adapter is configured to join the body member to a threaded rear cell of an OTA.

19. The Crayford focuser as in claim 11, further comprising:
a first screw disposed on the first bearing holding structure, the first screw configured to adjust a tilt angle of the first bearing rail; and
a second screw disposed on the second bearing holding structure, the second screw configured to adjust a tilt angle of the second bearing rail.

20. A Crayford focuser, comprising:
a body member having an inner wall defining a central channel;
a first bearing holding structure extending outward from the inner wall and being open to the central channel at one end;
a second bearing holding structure extending outward from the inner wall and being open to the central channel at one end;
first and second bearing rails removably held by the first bearing holding structure and the second bearing holding structure, respectively;
a bottom cover having a central opening aligning with the central channel;
a top cover having a central opening aligning with the central channel, the top cover and the bottom cover being configured to sandwich the body member therebetween and hold the first and second bearing rails within the first bear holding structure and the second bearing holding structure, respectively; and a drawtube dimensioned to slide within the central channel of the body member.

21. The Crayford focuser as in claim 20, wherein each of the first and second bearing rails include a bearing oriented to facilitate movement parallel to a central axis of the body member.

22. The Crayford focuser as in claim 20, wherein the bottom cover includes an optical tube assembly (OTA) adapter configured to join the body member to an OTA.

23. The Crayford focuser as in claim 22, wherein the OTA adapter is configured to join the body member to one of a curved side surface of an OTA or a threaded rear cell of an OTA.

24. A body member for a Crayford focuser having a drawtube, the body member comprising: an inner wall defining a central channel of the body member; a bearing holding structure extending from the inner wall and having a channel that opens into the central channel; a bearing rail configured to be slidingly received and mounted within the channel of the bearing holding structure, wherein the bearing rail extends in a longitudinal direction parallel to a longitudinal axis of the central channel of the body member; and a bearing mounted on the bearing rail and oriented to contact and facilitate movement of the drawtube along the longitudinal axis of the central channel.

25. The body member of claim 24, wherein the bearing comprises a roller bearing.

\* \* \* \* \*